United States Patent
Huang et al.

(10) Patent No.: US 12,202,752 B2
(45) Date of Patent: Jan. 21, 2025

(54) METHOD FOR PROCESSING WASTEWATER HAVING ORGANIC HIGH-CONCENTRATION AMMONIA-NITROGEN

(71) Applicant: CPC Corporation, Taiwan, TKaohsiung (TW)

(72) Inventors: Yi-Fong Huang, Chiayi (TW); Shih-Yuen Chang, Chiayi (TW); I-Cheng Chou, Chiayi (TW); Mao-Yuan Tu, Chiayi (TW); Guo-Hsu Lu, Chiayi (TW)

(73) Assignee: CPC Corporation, Taiwan, Kaohsiung (TW)

( * ) Notice: Subject to any disclaimer, the term of this patent is extended or adjusted under 35 U.S.C. 154(b) by 538 days.

(21) Appl. No.: 17/374,042

(22) Filed: Jul. 13, 2021

(65) Prior Publication Data

US 2022/0112106 A1    Apr. 14, 2022

(30) Foreign Application Priority Data

Oct. 12, 2020   (TW) .................................. 109135230

(51) Int. Cl.
C02F 1/72    (2023.01)
C02F 1/32    (2023.01)
(Continued)

(52) U.S. Cl.
CPC .............. C02F 1/725 (2013.01); C02F 1/32 (2013.01); C02F 1/66 (2013.01); C02F 1/722 (2013.01);
(Continued)

(58) Field of Classification Search
CPC .......... C02F 1/725; C02F 1/722; C02F 1/727; C02F 1/74; C02F 1/72; C02F 1/66;
(Continued)

(56) References Cited

FOREIGN PATENT DOCUMENTS

CN    106955708 A     7/2017
CN    107519877 A   * 12/2017 ............ B01J 23/005
(Continued)

OTHER PUBLICATIONS

English Machine Translation CN110759578A; Cui et al. (11 pages) (Year: 2020).*
(Continued)

*Primary Examiner* — Hayden Brewster
(74) *Attorney, Agent, or Firm* — Demian K. Jackson; Jackson IPG PLLC

(57) ABSTRACT

A method is provided for processing wastewater having organics even together with high-concentration ammonia-nitrogen, using an apparatus, comprising a catalyzation tank and a subsequent neutralization tank. Organic ammonia-nitrogen wastewater is introduced into tank for reaction without being pre-adjusted by acidic agent or mixing with other additives. A persulfate oxidant is used to process high-efficiency oxidative degradation for ammonia-nitrogen and toxic organics in wastewater through catalyzing oxidation of ultraviolet activation, tiny-amount-transition-metal catalyzation, or both of them, for simultaneous reductions or complete removals of ammonia-nitrogen and organic carbon contents. After neutralization according to actual needs, the final output is complied with biological treatment conditions, discharged-water quality standards, or recycled-water standards. With the high-efficiency catalyzing oxidation, various toxic organics, aromatics, and heterocyclic compounds are degraded; furthermore, ammonia-nitrogen are converted into non-toxic nitrogen gas and nitrate-nitrogen. Finally, ammonia-nitrogen and nitrate-nitrogen in wastewater can be reduced with efficiency, or even completely removed.

15 Claims, 12 Drawing Sheets

(51) Int. Cl.
*C02F 1/66* (2023.01)
*C02F 101/16* (2006.01)
*C02F 101/30* (2006.01)
*C02F 103/06* (2006.01)
*C02F 103/36* (2006.01)

(52) U.S. Cl.
CPC ...... *C02F 2101/16* (2013.01); *C02F 2101/30* (2013.01); *C02F 2103/06* (2013.01); *C02F 2103/365* (2013.01); *C02F 2305/023* (2013.01); *C02F 2305/10* (2013.01)

(58) Field of Classification Search
CPC .... C02F 1/32; C02F 1/325; C02F 2201/3222; C02F 2201/32; C02F 2103/06; C02F 2103/34; C02F 2103/365; C02F 2305/023; C02F 2305/026; C02F 2305/10; C02F 2101/16; C02F 2101/163; C02F 2101/30; C02F 7/00; C02F 2209/02; C02F 2209/08; C02F 2209/14; Y02W 10/10
USPC ...................................... 210/748.1
See application file for complete search history.

(56) References Cited

FOREIGN PATENT DOCUMENTS

| | | | | |
|---|---|---|---|---|
| CN | 108928993 A | * | 12/2018 | |
| CN | 110759578 A | * | 2/2020 | ............... C02F 9/00 |
| JP | 11-099394 A | | 4/1999 | |
| JP | 2009-022940 A | | 2/2009 | |
| JP | 2011-200848 A | | 10/2011 | |
| TW | I560149 B | | 12/2016 | |
| TW | I633065 B | | 8/2018 | |
| TW | M567663 U | | 10/2018 | |
| TW | I646057 B | | 1/2019 | |
| TW | M577423 U | | 5/2019 | |
| WO | WO 2015066811 A1 | | 5/2015 | |
| WO | WO 2015164744 A1 | | 10/2015 | |

OTHER PUBLICATIONS

English Machine Translation CN-108928993-A; Li et al. (7 pages) (Year: 2018).*

* cited by examiner

METHOD FOR PROCESSING WASTEWATER HAVING ORGANIC HIGH-CONCENTRATION AMMONIA-NITROGEN

TECHNICAL FIELD OF THE INVENTION

The present invention relates to processing organic ammonia-nitrogen wastewater; more particularly, to a high-efficiency method of simultaneously catalyzing, oxidizing, and degrading high-concentration ammonia-nitrogen and organic pollutants in wastewater, where the removal of organic suspending solids, the beforehand adjustment of pH value, and dilution are not required; and catalyzing oxidation is processed by activating a persulfate oxidant with ultraviolet (UV) illumination, catalyzing the persulfate oxidant with a trace of a transition-metal, or both of the above two operations.

DESCRIPTION OF THE RELATED ARTS

The general industrial wastewater treatment is often three methods combined: physical, chemical, and biological ones. In addition, the treatment used in current factories must at least undergo primary physical and chemical treatment (such as chemical coagulation sedimentation) and secondary biological treatment (such as activated sludge method) to be complied with wastewater discharge standards. However, with the rapid development of various industries, the compositions of chemical and industrial wastewaters produced are becoming more and more complex. The compounds contained in these special wastewaters are toxic or inhibitory to organisms, which make them hard to be decomposed by organisms as biological treatment is not effective. In severe cases, they may even cause a large number of deaths of microorganisms in the biological processing unit as exceeding the discharge standard or polluting the environment.

For numerous industries in the world, the characteristics of their wastewaters and respective qualities are very different. Most factories must develop and set up advanced oxidation treatment in a timely manner for meeting the increasingly stringent regulations and emission standards. In addition to the toxic high-concentration organic wastewater, high-concentration ammonia-nitrogen wastewater is one of the most difficult types of wastewater for industries. The gaseous or liquid ammonia and other highly toxic substances are easy to leak due to corrosion, which are specific chemical substance regulated. The pharmaceutical and chemical industries, fertilizer industries, petrochemical industries, coking industries, and smelting industries are all major industries that discharge high-concentration ammonia-nitrogen wastewater. Depending on the concentration of ammonia-nitrogen in wastewater together with different operating principles, the treatments can be divided into physical treatments (recycling), chemical treatments, and biological treatments. Commonly used methods include steam stripping recovery, gas stripping removal, breakpoint chlorination, ion exchange, fluidized bed crystallization, and biological nitrification and denitrification. For small-volume wastewater with high-concentration ammonia-nitrogen (>1% or >10000 mg/L) produced by factories, the industries generally adopt physical stripping method to remove ammonia-nitrogen to form a higher concentration of ammonia (10~20%) and then recycle it. However, the shortcoming of this stripping method is the need to use a lot of hot steam with high energy consumption; and the stripping method has low efficiency for the removal of ammonia-nitrogen (especially the poor removal efficiency of ammonia-nitrogen at low temperature). Besides, the limitation of the above two methods is that they can only effectively remove non-organic free ammonia-nitrogen but not organic ammonia-nitrogen; and they are usually accompanied with the escape of ammonia and volatile organic compounds (Volatile organic compound, VOC) with secondary wastewater in need of further processing. Other methods mentioned above (such as biological nitrification and denitrification, breakpoint chlorination, ion exchange, fluidized bed crystallization, etc.) are suitable for treating low-concentration ammonia-nitrogen wastewater. Their disadvantage is that their applications are limited due to the biological inhibition of free ammonia-nitrogen along with cost and required land space. At the same time, a lot of ammonia-nitrogen wastewater contains high salt content, which is difficult for subsequent biochemical treatment. As a result, many high-concentration ammonia-nitrogen wastewater cannot meet the discharge standards, which is currently hard to handle.

Recently, related studies and patents (such as WO2015066811A1, WO2015164744A1, I560149, I633065, I646057, M577423, M567663, etc.) point out that electrodialysis together with membrane method, or electrodialysis coordinated with membrane method, can be used to treat high-concentration ammonia-nitrogen wastewater. They claim the advantage of only emitting harmless nitrogen ($N_2$) and hydrogen ($H_2$). However, they have problems in that their installation costs and consumables are high; their processes consume a lot of power; and the ion exchange membranes used are easily blocked by organic substances during operation with biofilms formed as reducing their water production rates. Or, the treatment efficiency of ion exchange membranes may be affected by other chemicals in the wastewater to increase operation difficulty and processing cost. Hence, the above methods is limited in that they can only effectively remove non-organic free ammonia-nitrogen but not organic ammonia-nitrogen and their concentrated discharged wastewater must be treated separately. In addition, ammonium sulfate or ammonium chloride as a by-product of the membrane method shall not be used as agricultural fertilizer, whose use is limited as in fear of subsequent processing cost and problem. Furthermore, the disadvantage of the electrochemical method is the electrical energy consumed in the process as thereby increasing operating cost. In the process of industrialization of this method, there are still many technologies that need to be broken through.

Even though there are many methods for processing ammonia-nitrogen (usually non-organic ammonia-nitrogen) wastewater, it is usually still in need of adopting a series of multiple technologies for achieving processing targets. At present, there is no way to process organic ammonia-nitrogen wastewater with high efficiency, economy, speed and stability simultaneously. Therefore, how to achieve simple operation, stable processing performance, and low cost is an important direction for future global development, where the most important processing technologies are to efficiently remove organic ammonia-nitrogen in wastewater.

In recent years, advanced oxidation technologies have been gradually widely used in the treatment and remediation of soil and groundwater (generally referring to in-situ chemical oxidation (ISCO) remediation), where visible results can be found in all kinds of industrial wastewater, drinking water, etc. There are many chemical oxidation methods. By distinguishing the type of oxidant used, more common methods include permanganate method, ozone method, persulfate method, and catalyzed hydrogen peroxide ($H_2O_2$) propagation (CHP) method. The CHP method usually comprises Fenton's reagent. Many studies (such as U.S. Pat. No. 9,616,472 B2, etc.) also point out that these methods have their own advantages, disadvantages and limitations. For example, permanganate is easily affected by the existence of other organic substances in nature to be consumed by ineffective reactions. The hydrogen peroxide of the CHP method is prone to be decomposed ineffectively during propagation in the underground soil system, where its transmission to import is not easy and how to effectively control the contact and reaction with the target pollutants before being ineffectively decomposed is also not easy. The ozone method is limited by the gas phase of ozone itself. How to control its solubility and introduce it into underground system or aqueous phase to effectively participate in reaction is also a big problem. Moreover, the industrialization of the ozone generating device of this method is hard to be scaled up, which is also a major challenge for industrial application.

According to prior arts and related researches, persulfates dissolved in water will form persulfate ions ($S_2O_8^{2-}$), whose redox potential (Eo=2.01 V) is second only to ozone ($O_3$) (Eo=2.07 V). Although $S_2O_8^{2-}$ has a slow dynamic reaction rate to many organic substances (i.e. $S_2O_8^{2-}$ has a slower oxidation rate for many organic substances), it is mainly used as the main strong oxidant (derived oxidant) to be used in the treatment system in terms of overall "persulfate oxidation technologies", whose redox potential is as high as Eo=2.60 V. As compared to hydrogen peroxide, persulfate is relatively safe and much more stable in storage and in some applied system of medium, which can be decomposed in water to release oxygen and sulfate (sodium sulfate or potassium sulfate) without producing harmful substances. For example, it is applied to soil and groundwater system that is not affected by other organic substances (i.e. non-target pollutants) in medium to be decomposed in advance and, as a result, it is unable to effectively react with target pollutant. In another word, persulfate has better control over oxidation than other oxidants such as hydrogen peroxide.

Furthermore, regarding the applications of persulfate oxidation, most current popular ones are used in the academic researches where only a single pollutant is existed and the pollutant concentration is low, and in the case of on-site chemical oxidation treatment of soil and groundwater, especially those in the current site of groundwater contaminated by organics. At present, there are not cases mature and successful enough to be actually used in processing petrochemical and refinery-industry wastewaters (having complex pollutants and high biological toxicity), specifically in processing "high-concentration industrial organic ammonia-nitrogen wastewater".

According to related prior arts, persulfate can be activated by alkalis (such as sodium hydroxide (NaOH)) or transition metals such as ferrous ion (Fe2+) to generate free radicals of $SO_4^-$. for processing something like Fenton's reaction. But, even the persulfate oxidation has great potential for application, it may not always work when it is actually applied to on-site chemical oxidation. It is because the deriving of the free radicals ($SO_4^-$.) through activation with persulfate is not effectively controlled and reacted with organic pollutants, where ferrous ions are fail in precipitation owing to the limitation of pH>4. However, although some control methods can be used to promote the initial reaction for processing at a higher pH (pH>4), it still basically cannot be directly applied to relatively alkaline or even strong alkaline systems. Some prior arts (such as U.S. Pat. No. 9,616,472 B2) are applied by adding carbohydrate (glucose, fructose, lactose, etc.) to replace the metal activators. However, they may be extremely unsuitable for processing actual "high-concentration pollutant (source)". It is because these added sugars are still composed of organics. Although sugar (carbohydrate) can be decomposed by microorganisms, they are in risk of increasing additional chemical oxygen demand (COD) organic pollution in addition to the organic pollutants of the original system when the concentration of the added sugar (carbohydrate) is sharply increased in an instant. Another patent CN107519877A proposes a composite catalyst made of cobalt spinel or doped cobalt spinel supported on the surface of a carbonaceous material. It can be used to catalyze persulfate for oxidizing ammonia-nitrogen wastewater. However, the synthetic catalyst matrix of the patent are a variety of carbon sources, which is similar to the aforementioned patent U.S. Pat. No. 9,616,472 B2 as existing additional organic materials other than target pollutants. It is quite possible that additional COD risk may actually happen in its derivative system due to the disintegration and loss of the catalyst structure (such as acid decomposition, wear, etc.) during the wastewater treatment under a certain harsh condition. Furthermore, the composite catalyst cannot be practically applied to the treatment of acidic wastewater and waste acid (the actual ammonia-nitrogen-containing wastewater/waste liquid may not only exist in neutral or alkaline condition; and ionic ammonia can stably exist in wastewater under acidic condition). Its main defect lies in that the acidic environment will cause iron oxide and composite metal to undergo acidic dissolution, which may cause iron sludge generation and subsequent treatment problems. As a result, this is the reason why the prior art is limited in processing neutral wastewater (pH6.5~7.5). In addition, the concentration of the ammonia-nitrogen in wastewater that can be treated by the prior art is low, which is also one of its main disadvantages. Hence, such a low ammonia-nitrogen concentration is usually processed by adopting more economic biological treatment (i.e. denitrification, anti-denitrification, etc.) for industries. Besides, the prior art needs to repeatedly rinse with clean deionized water when processing and reusing the catalyst, which may cause secondary wastewater problem.

In summary, even though these prior arts can meet specific requirements like separation and recycling through the addition of auxiliary agents such as sugar (carbohydrate) or carbon sources with assistance; through metal composite catalysts prepared with carbon-containing materials; or through other organic substances such as polymer, etc., they eventually limit the scope of catalytic oxidation for actual application regarding wastewater quality (as subject to the neutral condition). Thus, it is not possible to cope with the changing demands of modern industrial wastewater. Hence, the prior arts do not fulfill all users' requests on actual use.

SUMMARY OF THE INVENTION

The main purpose of the present invention is to provide high-efficiency catalyzing oxidation, where wastewater is processed for degrading high-concentration ammonia-nitrogen and organic pollutants at the same time.

To achieve the above purpose, the present invention is a method of (photo-)catalyzing oxidation for simultaneously processing high-concentration ammonia-nitrogen and organic pollutants contained in wastewater, where an apparatus comprising a (photo-)catalyzation tank and a neutralization tank is used; the above two tanks are linked in series and recycled separately; the method mainly introduces the wastewater into the tanks to directly process catalyzing/ activating oxidation without adding/adjusting acid regulator, buffer, or other additive; an oxidant in the catalyzation tank processes catalyzing oxidation of activation through ultraviolet (UV) illumination, catalyzation with a trace of a transition metal ($M^{n+}$), or both of the above reactions to achieve the removal of the ammonia-nitrogen and organic pollutants through degradation; in the neutralization tank, a pH value is adjusted according to an actual pH value of water obtained after reaction, or allowed pH values of physical and biological processing units of factories (fields) subsequently connected and converged, or, after the ammonia-nitrogen and COD are treated to reach an actual pH draining standard (usually 6~9), the pH value is adjusted according to the draining standard; a tiny amount, even to a part-per-million (ppm) level (usually between several mg/L to 30 mg/L), of a catalyst is used; on applying to actual connected and converged factories (fields) with the physical and biological processing units, the amount of the catalyst easily achieves less than 1 ppm to fully comply with the draining standard of environmental protection law; and existing commercial technologies concerning the recycling of tiny amount of transition metal, such as ion exchange resins and capture agents, etc., are applicable for coordination with related factories (fields) in the future to further meet the future development trend of zero carbon emission.

The catalyzing oxidation is a process of activation through UV illumination (UV wavelength=180 nanometers (nm)~365 nm) with an oxidant of a persulfate (sodium persulfate (SPS, $Na_2S_2O_8$), potassium persulfate (KPS, $K_2S_2O_8$), etc.), a potassium peroxymonosulfate (PMS, $2KHSO_5 \cdot KHSO_4 \cdot K_2SO_4$), or a mixture of the above compounds, a process of catalyzation with a trace of a transition metal (especially Co(II) or Co(III)) added, or an operation of additively processing both of the above processes; the oxidation is to process the oxidant through catalyzation/activation to generate free radicals of $SO_4^-\cdot$, $SO_3^-\cdot$, $SO_5^-\cdot$, and HO. for oxidizing and degrading the organic pollutants in wastewater to obtain more harmless and smaller organic molecules (such as a short carbonic acid of formic acid, acetic acid, oxalic acid, etc.) even with an effect of mineralization achieved; and, at the same time, the ammonia-nitrogen in water is converted into nitrate-nitrogen and nitrogen gas in the reaction even with an effect of complete denitrification achieved. Therein, through the UV illumination, the persulfate or PMS is activated and promoted to form free radicals of $SO_4^-\cdot$ and HO.; and, furthermore, in a reaction apparatus for processing the catalyzation, oxidation, and degradation with the help of the transition metal, the reduction of the transition metal (reducing $M^{(n+1)+}$ back to $M^{n+}$) is additively processed through the UV illumination and additional free radicals of R. and HO. are generated for additively processing the degradation. The oxidation and degradation of the ammonia-nitrogen is as follows:

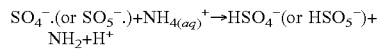

The promotion involved with aeration is:

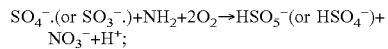

the promotion involved with the transition metal is:

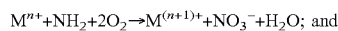

the promotion involved at the same time with the UV illumination is

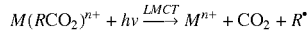

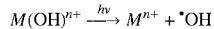

where R. are intermediate free radicals derived from the degradation of organics and ROO. are superoxide radicals derived from R.

The nitrate-nitrogen ($NO_3^-$) formed by the oxidation is easily metabolized and decomposed by microorganisms; and, on applying to the actual factories (fields), the nitrate-nitrogen can be easily dealt with through subsequent connected biological units. This series of denitration processes achieves denitrification. Therein, the organics involved in the denitration, including their intermediate derivatives, also play a role similar to those denitrifying bacteria in biological systems while using nitrate-nitrogen as a terminal electron acceptor in electron transfer for material energy exchange. The total denitration processes can be simply expressed as follows:

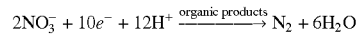

However, the amount of the catalyst of the transition metal of Co(II) required by the present invention is extremely small to a level of tens of ppm at most and no other sludge problems are to be bothered with (such as the precipitation of iron hydroxide ($Fe(OH)_{3(S)}$), where Co(III) in the present invention can be continuously catalyzed and recycled for reuse by reducing back to Co(II). Co(II) catalyzes the persulfate (or PMS) to form free radicals of ions of $SO_4^-\cdot$, HO., and Co(III). The Co(III) reacts with $SO_4^{2-}$ (or $SO_5^{2-}$) in water for generating additional free radical of $SO_4^-\cdot$ (or $SO_5\cdot$) and reducing Co(III) back to Co(II). Furthermore, the aeration (with air or oxygen) performed by the present invention makes oxygen participate in reaction and derive an intermediate product, such as an alkyl radical of R., etc., from the degradation of the organics to form a superoxide radical of ROO.; and the ROO. reduce Co(III) back to Co(II) and derive additional free radical of HO. to maintain high-efficiency catalyzation and oxidation. Therein, the main reduction of the transition metal is as follows:

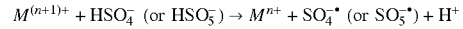

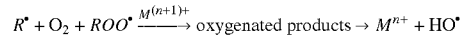

The advantage of the (photo-)catalyzing oxidation is that not only high-efficiency simultaneous degradation of high-concentration ammonia-nitrogen and organic pollutants contained in wastewater; but also organic suspending solids are removed without any pretreatment and apparatus, any dilution, or even pH adjustment. Thus, the present invention directly processes industrial high-concentration organic ammonia-nitrogen wastewater in a short time while obtaining good efficiency in degradation and denitrification.

BRIEF DESCRIPTION OF THE DRAWINGS

The present invention will be better understood from the following detailed description of the preferred embodiment according to the present invention, taken in conjunction with the accompanying drawings, in which.

DESCRIPTION OF THE PREFERRED EMBODIMENT

Figure 1A:
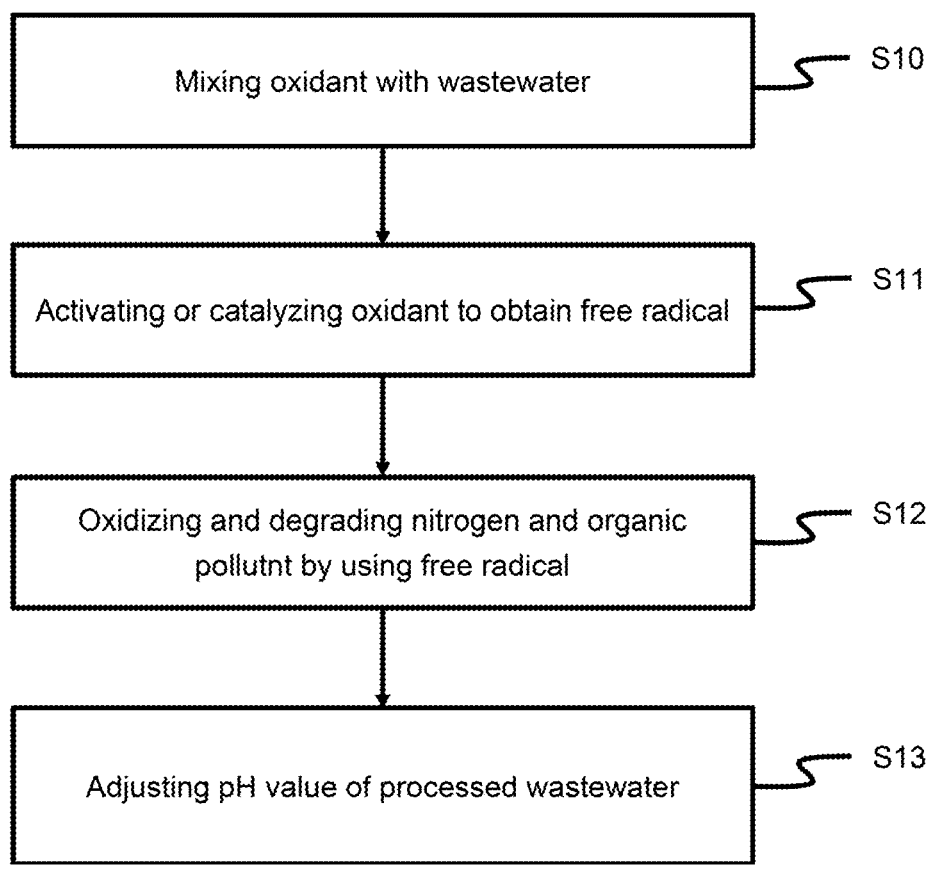
FIG. 1A is the flow view showing the preferred embodiment according to the present invention.

The following description of the preferred embodiment is provided to understand the features and the structures of the present invention.

As is well-known, persulfate generates free radicals of $SO_4^-$. together with sulfate ions through alkali (NaOH) catalyzation; however, the reaction based on NaOH catalyzation is very slow and the effect of organic-pollutant oxidization is not good. Hence, the present invention proposes a method for activating persulfate (or peroxymonosulfate (PMS)) to effectively produce the free radicals of $SO_4^-$. under alkali condition and quickly oxidize and degrade target pollutants comprising ammonia-nitrogen and organics.

The present invention is accomplished through activation with UV illumination, catalyzation with cobalt ions, or the combination of UV activation and cobalt-ion catalyzation.

The UV illumination is not limited to the pH value of wastewater. With the characteristics of cobalt (Co(II)), ionic dissolution can be maintained under a higher pH, applicable for a wider pH range. Through proper operation, reactions happen under neutral or even alkaline conditions to prevent things like Fenton's reagent's iron (Fe(II)) catalyst failure (i.e. iron hydroxide ($Fe(OH)_3$) precipitation).

Furthermore, under a neutral condition (pH=7), the redox potential of the $SO_4^-$. free radical is higher than that of the HO. radical. The oxidant, the $SO_4^-$. free radical, is different from the non-selective HO. free radical, whose processing effect to harmful organics like 2,4-dichlorophenol (2,4-DCP), atrazine, naphthalene, etc. is better than that of the HO. free radical.

Related technologies are used for single pollutant with low concentration and in-situ chemical oxidation (ISCO) of soil and groundwater. Thus, the present invention uses the $SO_4^-$. free radical with its selectivity to target pollutants for practically applying to petrochemical and refinery wastewater having high-concentration complex pollutant with high biological toxicity in hope of achieving a breakthrough particularly in handling "industrial high-concentration organic ammonia-nitrogen wastewater".

Please refer to FIG. 1A to FIG. 10, which are a flow view showing a preferred embodiment according to the present invention; a flow view showing catalyzation, oxidation, and degradation with Co(II); a flow view showing activation, oxidation, and degradation through UV illumination; a framed view showing catalyzation, oxidation, and degradation with Co(II); a framed view showing activation, oxidation, and degradation through UV illumination; a view showing the relationship of time to the COD, ammonia-nitrogen concentration, nitrate-nitrogen concentration, COD removal rate, and ammonia-nitrogen removal rate of a first state-of-use; a view showing the relationship of time to the COD, ammonia-nitrogen concentration, nitrate-nitrogen concentration, COD removal rate, and ammonia-nitrogen removal rate of a second state-of-use; a view showing the relationship of time to the COD, ammonia-nitrogen concentration, nitrate-nitrogen concentration, COD removal rate, and ammonia-nitrogen removal rate of a third state-of-use; a view showing the relationship of time to the COD, ammonia-nitrogen concentration, nitrate-nitrogen concentration, COD removal rate, and ammonia-nitrogen removal rate of a fourth state-of-use; a view showing the relationship of time to the COD, ammonia-nitrogen concentration, nitrate-nitrogen concentration, COD removal rate, and ammonia-nitrogen removal rate of a fifth state-of-use; a view showing the relationship of time to the COD and COD removal rate of a first comparative state-of-use; and a view showing the relationship of time to the COD and COD removal rate of a second comparative state-of-use. As shown in the figures, the present invention is a method for processing wastewater having organics even together with high-concentration ammonia-nitrogen, as accompanied with an operating condition of catalyzing oxidation using an activating oxidation agent for UV illumination, a trace of a catalyzing oxidation agent of a transition metal, or both of them; and the compositions of catalyst for uses. The present invention uses a certain ratio of cobalt ions (specifically those of cobalt sulfate and its mixture without those of nitrate and chloride included), and persulfate (specifically sodium persulfate ($Na_2S_2O_8$) and potassium persulfate ($K_2S_2O_8$)) or potassium peroxymonosulfate (PMS, specifically potassium peroxymonosulfate sulfate ($2KHSO_5.KHSO_4.K2SO_4$)) as reagents of intermixed ingredients, where no dilution or pH adjustment is required.

In FIG. 1A, the flow of (photo-)catalyzing oxidation for degrading ammonia-nitrogen and organic pollutants in wastewater is shown as follows:

Step S10: An oxidant (persulfate or PMS) is well-mixed with wastewater to-be-treated, where a ratio (in milligram per liter (mg/L)) of the oxidant (Ox) to a COD together with ammonia-nitrogen (Ox/(COD+ammonia-nitrogen)) is 0.1~30; and the oxidant is a persulfate, a PMS, or a mixture of the above two compounds. Therein, a preferred ratio (in mg/L) of Ox/(COD+ammonia-nitrogen) is 3.5~16.

Step S11: The oxidant dissolved in the to-be-treated wastewater is processed through activation by applying UV illumination, catalyzation by adding a catalyst of a transition metal ($M^{n+}$), or both of the above two reactions. Aeration is processed by applying air or oxygen to derive free radicals through the activation with UV or the catalyzation with the transition metal. Therein, the transition metal is divalent ferrum (Fe(II)), divalent cobalt (Co(II)), divalent nickel (Ni(II)), divalent cuprum (Cu(II)), divalent zinc (Zn(II)), any mixture of the above, or any derivative of the above; neither the mixture nor the derivative is a nitrate or a chloride; the ratio (in mg/L) of the catalyst of the transition metal of Co(II) to the oxidant is 0.0001~0.002; the to-be-treated wastewater processed through the activation with UV illumination has no limit in its initial pH value (pHi), which is 0~14; and the to-be-treated wastewater processed through the catalyzation with the transition metal of Co(II) has a pHi of 0~8.

Step S12: The free radicals thus generated are oxidized to degrade the ammonia-nitrogen and organic pollutants, where the ratio (in mg/L) of the catalyst of the transition metal to the oxidant is 0.00001~0.003; and the free radicals are active free radicals, at least including a selective free radical of $SO_4^-$. (or, of $SO_3$. or $SO_5^-$.), a non-selective free radical of HO., and a superoxide radical of ROO.

Step S13: The pH value of the to-be-treated wastewater is adjusted according to the requirement of a biological treatment unit or a wastewater discharge standard.

Figure 1B:
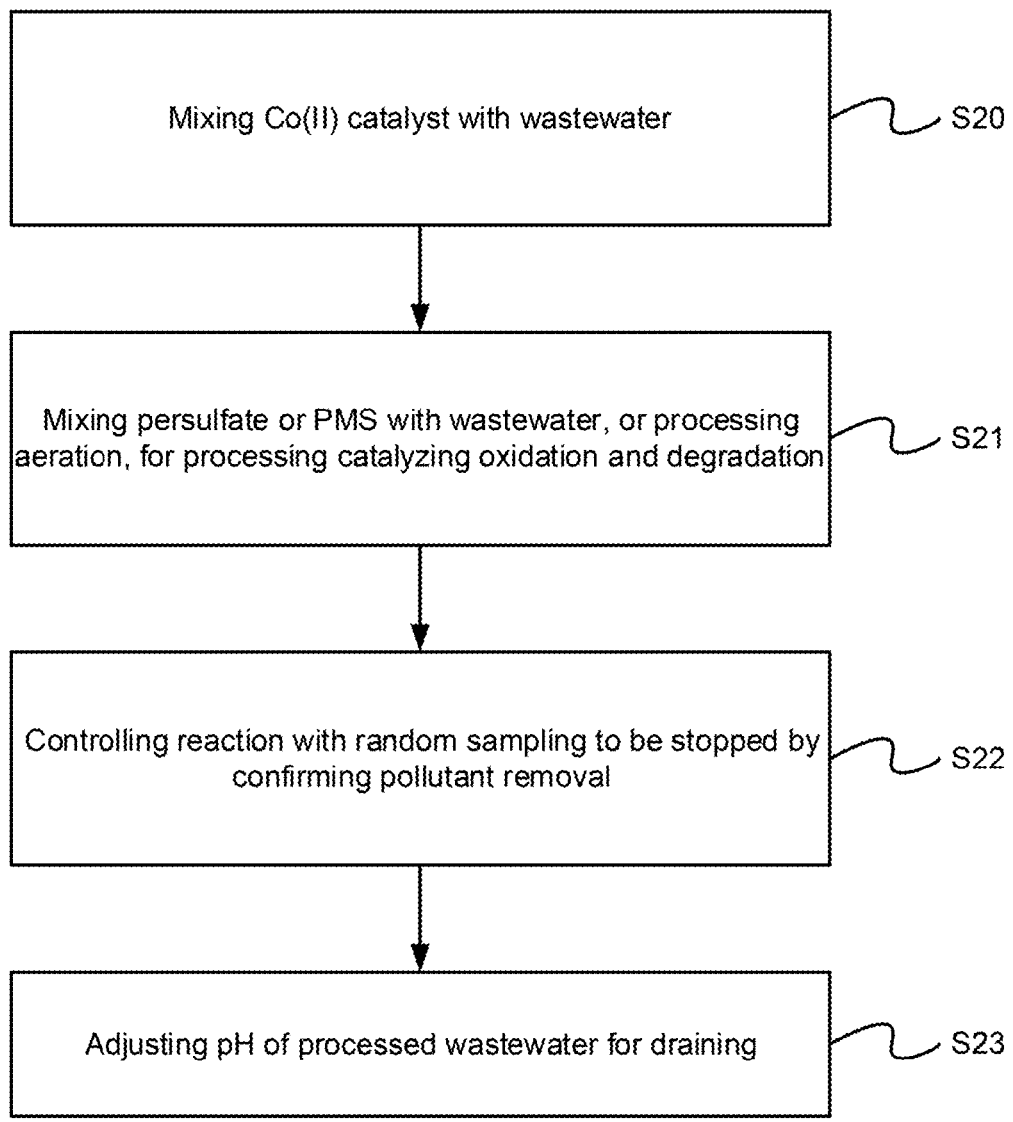
FIG. 1B is the flow view showing the catalyzation, oxidation, and degradation with Co(II)
Figure 2:
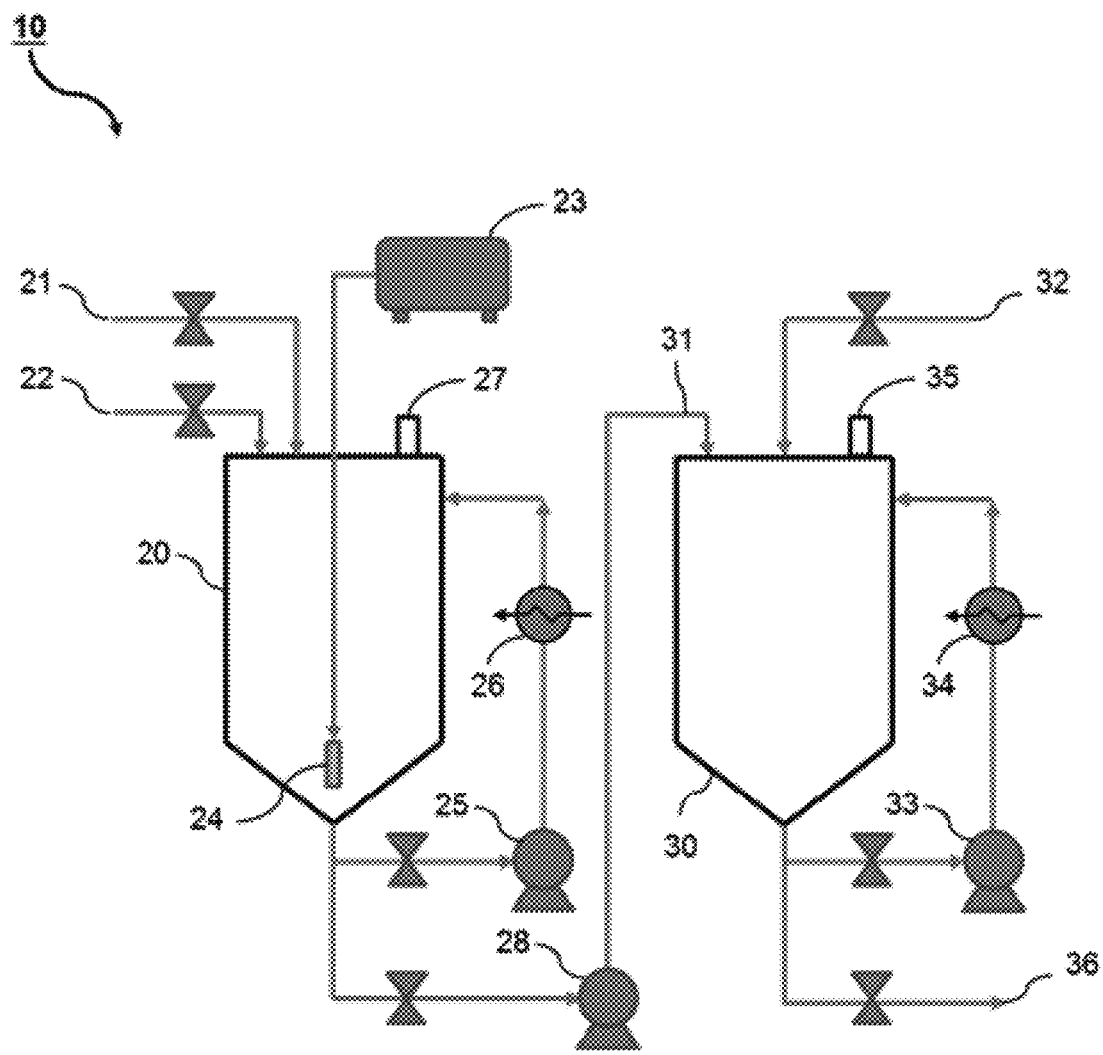
FIG. 2 is the framed view showing the catalyzation, oxidation, and degradation with Co(II)

In FIG. 1B and FIG. 2, diagrams for processing organic ammonia-nitrogen wastewater through catalyzing oxidation with Co(II) are shown, which comprises steps as follows:

Step S20: According to the content of the COD and ammonia-nitrogen ($NH_4^+$—N) in the to-be-treated organic ammonia-nitrogen wastewater (referred to as "to-be-treated wastewater"), a chemically dosed Co(II) ionic catalyst together with the to-be-treated wastewater is put into a catalyzation tank 20 of a catalyzing/activating oxidation unit 10 through a first inlet 21; and, under normal temperature and pressure, the catalyst is fully mixed with the to-be-treated wastewater through circulation (or mechanical stirring) by using an internal-circulating pump 25.

Step S21: Then, the chemically dosed oxidant (persulfate or PMS) is introduced into the catalyzation tank 20 through a second inlet 22 to be mixed with the catalyst/to-be-treated wastewater obtained in step S20 for reaction. It is necessary to maintain the circulation of the internal circulating pump 25 in the catalyzation tank 20 for promoting the catalyst and the oxidant to obtain sufficient mixing and contact; or to introduce air through an aerating terminal 24 by adding an aerating device 23 (i.e. to supply oxygen) for involving additional oxygen in reaction for promoting catalyzing oxidation and degradation.

Step S22: Reaction is processed with temperature controlled by a heat exchanger 26, where the reaction takes about 2~4 hours as being varied according to the composition and concentration of target pollutants in wastewater. Samples are taken randomly as reaction progresses; and, with the help of traditional COD analysis or online COD analyzer, along with ammonia-nitrogen analysis, nitrate-nitrogen ($NO_3^-$—N) analysis, etc., reaction stops by confirming the condition of pollutant removal.

Step S23: The processed solution is introduced into a neutralization tank 30 through a third inlet 31 by a bottom outlet pump 28. According to actual operating requirement, an acidic regulator is introduced through a fourth inlet 32 to adjust the pH value of the processed solution after the circulation (or mechanical stirring) by using an internal-circulating pump 33. Then, the solution is discharged from a bottom discharging port 36 as fitting a subsequent to-be-connected biological processing unit or meeting a discharging standard.

Figure 1C:
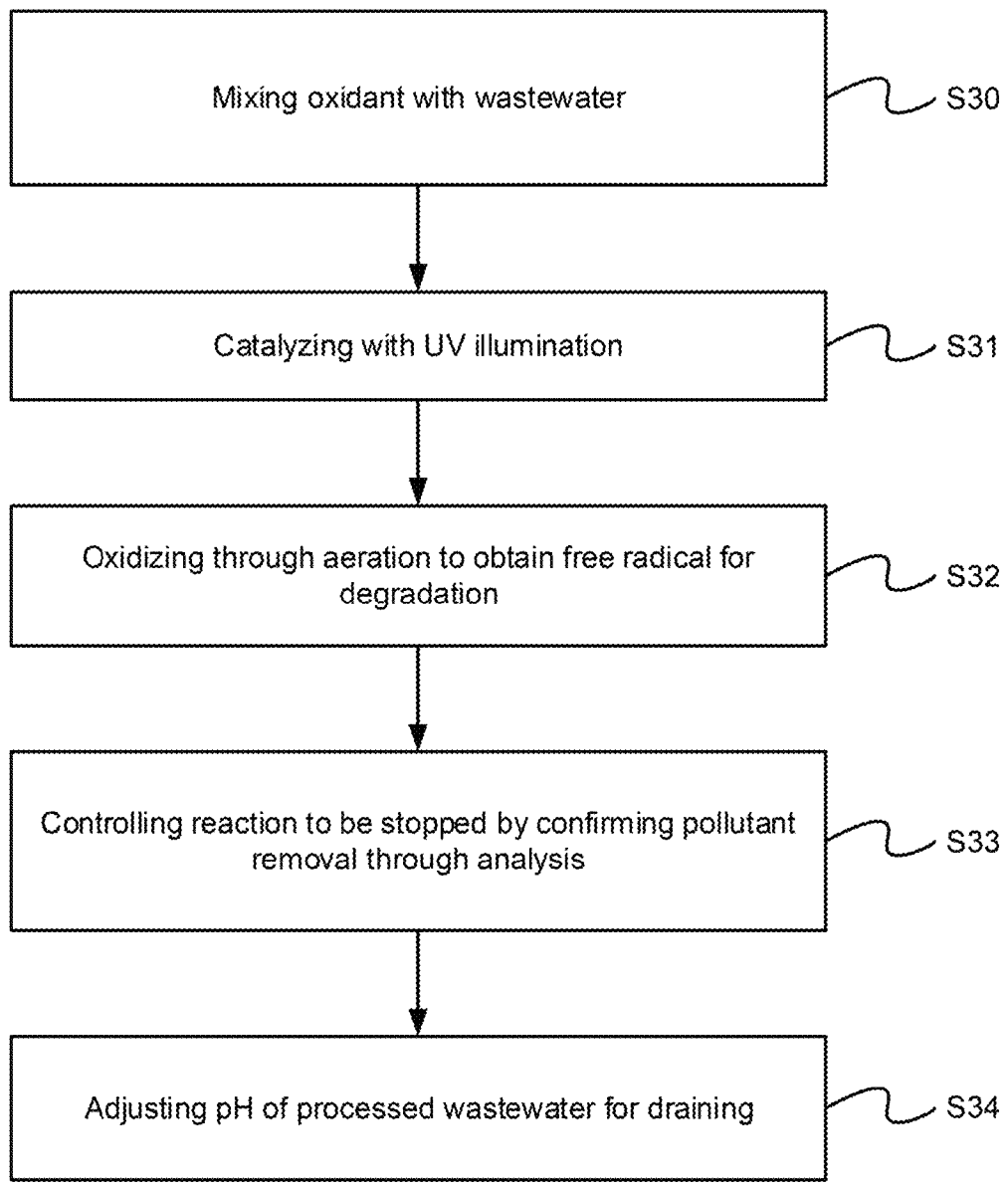
FIG. 1C is the flow view showing the activation, oxidation, and degradation through the ultraviolet (UV) illumination.
Figure 3:
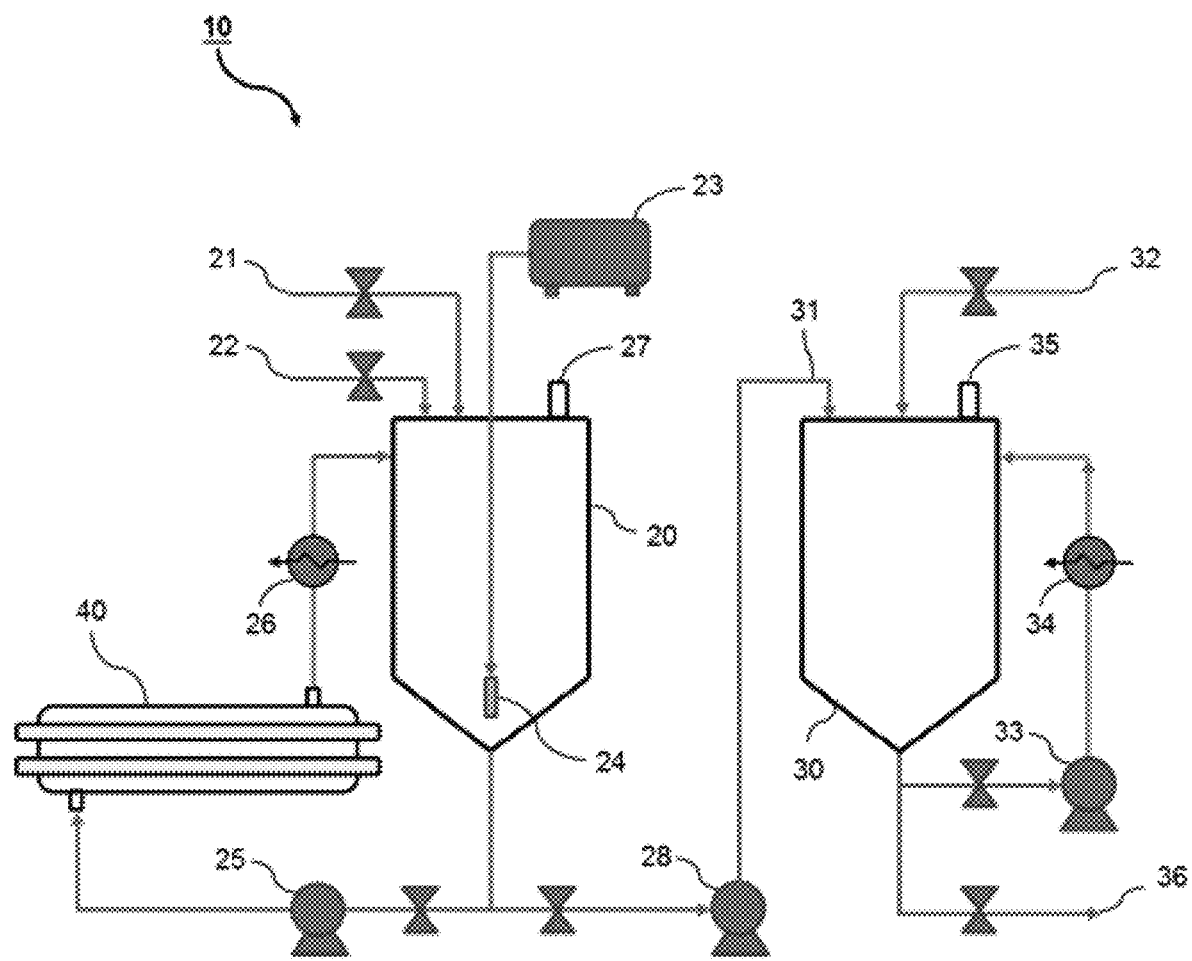
FIG. 3 is the framed view showing the activation, oxidation, and degradation through the UV illumination.

In FIG. 1C and FIG. 3, diagrams for processing organic ammonia-nitrogen wastewater through catalyzing oxidation by using UV illumination are shown, which comprises steps as follows:

Step S30: According to the content of COD and ammonia-nitrogen in the to-be-treated wastewater, the chemically dosed oxidant (persulfate or PMS) and the to-be-treated wastewater are directly put into a mixing tank (not shown in the figure); and the internal-circulating pump 25 is turned on to promote the fully and evenly mixing of the to-be-treated wastewater and the oxidant.

Step S31: A UV illumination device 40 is turned on; and, after the light source is stable (usually about a few minutes), the mixed solution in the mixing tank is introduced into the catalyzation tank 20 to process reaction.

Step S32: Simultaneously, air (or nitrogen gas) is introduced into the solution for aeration to generate a fluidized bed for promoting the mixing. Another effect of the aeration is to provide oxygen ($O_2$) to participate in chemical oxidation. Thus, additional free radicals (such as $O_2^-$., $HO_2$., ROO., etc.) derived from the oxidant are generated to accelerate pollutant degradation.

Step S33: As compared to catalyzation, oxidation, and degradation with Co(II), the reaction time of the catalyzing oxidation through UV illumination may exceed 4 hours. However, in actual operation, the reaction time depends on the pollutants and their concentrations in wastewater. Following the progress of reaction with the help of traditional COD analysis or online COD analysis along with ammonia-nitrogen analysis, $NO_3^-$—N analysis, etc., reaction stops by confirming the condition of pollutant removal.

Step S34: After reaction stops, depending on actual operational requirement, the pH value of the reacted solution is adjusted for fitting a subsequent to-be-connected biological processing unit or meeting a discharging standard.

During testing the degradation of the ammonia-nitrogen and organic pollutants, the degradation of pollutants will be phased, even quickly denitrified to generate nitrogen ($N_2$, the reaction of generating $N_2$ through denitrification is usually more significant than that of the conversion into nitrate-nitrogen, so that the concentration of residual nitrate-nitrogen is much less than that of initial ammonia-nitrogen in each state-of-use of the present invention) and mineralized to generate carbon dioxide ($CO_2$). Besides, on considering the possibility of pressure accumulation in the catalyzation tank 20 during the additional aeration (with air) or the rise in temperature, an exhaust port 27, 35 is installed on each of the tops of the catalyzation tank 20 and the neutralization tank 30. Yet, the technology and evaluation relating to end-gas recycle are beyond the scope of the present invention. Generally speaking, on encountering the above consideration, problem usually can be easily solved by using a heat exchanger 26,34 for controlling reaction.

All of the reaction temperatures of the states-of-use in the present invention are monitored under a normal pressure and the temperature will not exceed 40 degrees Celsius (° C.). The states-of-use in the present invention set their best operating temperature at 30~40° C. for those steps. Thus, a novel method for processing wastewater having organics even together with high-concentration ammonia-nitrogen is obtained.

The ammonia-nitrogen in the organic ammonia-nitrogen wastewater has a maximum concentration of 4500 mg/L; and a highest concentration of COD of 7500 mg/L for simultaneously degrading organics. Therein, a preferred concentration of the ammonia-nitrogen in the organic ammonia-nitrogen wastewater is 500~3000 mg/L; and a preferred COD of the concentration of organics is 500~6000 mg/L for simultaneous degradation.

A main pollutant source of the organic ammonia-nitrogen wastewater is industrial wastewater from petrochemical industries and refinery industries; target pollutants of the organic ammonia-nitrogen wastewater are ammonia-nitrogen and organics; and the organics are compounds each of which is a volatile organic, a non-volatile organic, a halogen-containing organic, a non-halogen organic, a polycyclic aromatic hydrocarbon, an aliphatic hydrocarbon, a heterocyclic hydrocarbon, a petroleum hydrocarbon, an organic solvent, or a polymer.

A pollutant source of the organic ammonia-nitrogen wastewater mainly comprises industrial wastewater, domestic wastewater, and groundwater.

The residence time and processing time required to deal with the organic ammonia-nitrogen wastewater are 1 hour (hr) to 8 hours (hrs) in total.

The present invention is further illustrated by the following states-of-use; and these states-of-use are used for further illustrating but not limiting the present invention.

[States-of-Use]

[State-of-Use 1] Co(II)-Catalyzed PMS Oxidation for Degrading Organic Ammonia-Nitrogen Wastewater from Refinery Industry The target to be treated in State-of-use 1 is high-concentration organic ammonia-nitrogen wastewater produced by refinery industry, whose ammonia-nitrogen and organics mainly come from wastewater with high ammonia-nitrogen concentration generated through alkaline washing of wastewater acid gas during petroleum refining process (residue fluid catalytic cracking, RFCC) (, as comprising complex compositions of cracked gases like ammonia-nitrogen, olefin (ethylene, propylene, etc.), aromatic hydrocarbon, gasoline, oil gas, etc.) Accordingly, a preferred state-of-use of FIG. 2 is obtained, where an oxidation method is used to catalyze sodium persulfate (SPS) or PMS with a trace of a catalyst of Co(II) for degrading wastewater. The following is the details: The wastewater containing high-concentration organic ammonia-nitrogen is obtained from refinery industry and its pHi is adjusted to around 4.62 at first with sulfuric acid for ensuring that ammonia are existed in water only in a non-dissipative and stable ionized form ($NH_4^+$), where the contents of ammonia-nitrogen and COD of the wastewater obtained after pH adjustment are examined—1140 parts-per-million (ppm) and 6245 ppm, respectively. An initial condition is thus set in advance for processing the Co(II)/PMS oxidative degradation shown in FIG. 2.

About 20 ppm of cobalt sulfate is provided as the required catalyst to be fully and evenly mixed with the to-be-treated wastewater. A measured ratio of Ox/(COD+ammonia nitrogen)=13.5 (with oxidant about 100000 ppm≈162 millimoles (mM)) of PMS is obtained as an oxidant to be fully mixed and contact with the above mixture of catalyst/wastewater; and the oxidation and degradation of pollutants are processed under a normal pressure and a controlled temperature not exceeding 40° C.

Figure 4:
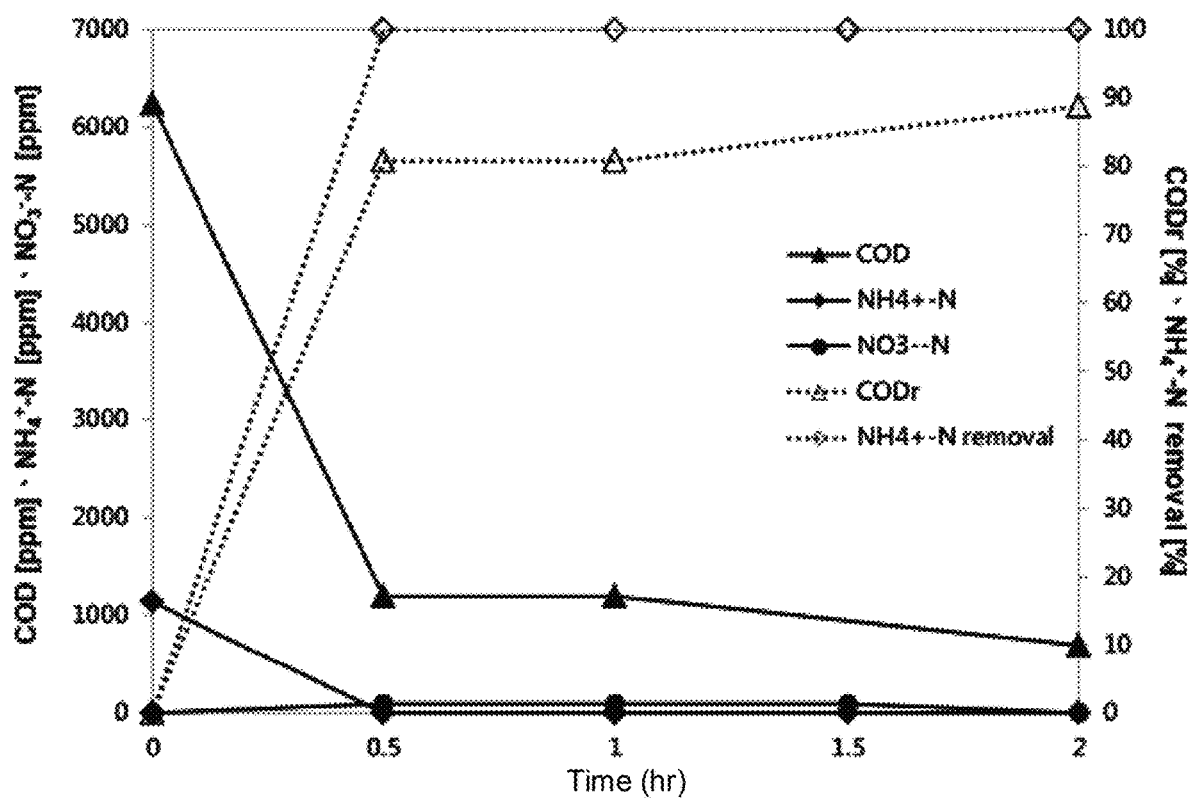
FIG. 4 is the view showing the relationship of time to the chemical oxygen demand (COD), ammonia-nitrogen concentration, nitrate-nitrogen concentration, COD removal rate, and ammonia-nitrogen removal rate of the first state-of-use.

A result of State-of-use 1 is shown in FIG. 4. According to the result, when the oxidative degradation is reacted for 0.5 hrs, the COD is greatly reduced from the original 6245 ppm to 1200 pm; and the ammonia-nitrogen is reduced from the original 1140 ppm to 0, where complete removal is achieved. Besides, nitrate-nitrogen is increased from 0 to 100 ppm after 1 hr of reaction (the nitrogen removal which generates $N_2$ is more significant than that which obtains nitrate-nitrogen through conversion, so that the concentration of residual nitrate-nitrogen in each state-of-use is much smaller than that of initial ammonia-nitrogen). When the reaction is processed for 2 hrs, the residual COD amount is 700 ppm; and nitrate-nitrogen is maintained at 100 ppm—which is the same as that at 0.5 hrs. It is shown in the result that, even if the present invention is operated under an acidity of pH<5 (pHi~4.62), not only COD is quickly and effectively degraded (where COD removal rate reaches 88.8 percent (%)); but also 1140 ppm of ammonia-nitrogen is completely removed at the same time (where ammonia-nitrogen removal rate reaches 100%); furthermore, the appearance before and after the treatment is significantly improved (which is yellow before the treatment, and is turned into clear and transparent after the treatment).

[State-of-Use 2] Co(II)-Catalyzed PMS Oxidation for Degrading Organic Ammonia-Nitrogen Wastewater from Refinery Industry The target to be treated in State-of-use 2 is still high-concentration organic ammonia-nitrogen wastewater produced by refinery industry, whose ammonia-nitrogen and organics mainly come from wastewater with high ammonia-nitrogen concentration generated through alkaline washing of wastewater acid gas during petroleum refining process. Accordingly, another state-of-use of FIG. 2 is obtained, where the same oxidation method is used to catalyze SPS or PMS with a trace of a catalyst of Co(II) for degrading wastewater. However, the actual quality of organic ammonia nitrogen wastewater from refinery industry is subject to change at any time following the operation at factory end (i.e. non-fixed quality). Therefore, the batch wastewater quality in State-of-use 2 is worse than those in State-of-use 1, where the contents of ammonia nitrogen and COD in State-of-use 2 are higher than those in State-of-use 1. The following is the details: The wastewater containing high-concentration organic ammonia-nitrogen is obtained from refinery industry and its pHi is adjusted to around 4.81 with sulfuric acid at first for ensuring that ammonia are existed in water only in a non-dissipative and stable ionized form ($NH_4^+$), where the contents of ammonia-nitrogen and COD of the wastewater obtained after pH adjustment are examined—4070 ppm and 7805 ppm, respectively. An initial condition is thus set in advance for processing the Co(II)/PMS oxidative degradation shown in FIG. 2.

Under the same condition of State-of-use 1, about 20 ppm of cobalt sulfate is provided as the required catalyst to be fully and evenly mixed with the to-be-treated wastewater. A measured ratio of Ox/(COD+ammonia nitrogen)=8.5 (with oxidant about 100000 ppm≈162 mM) of PMS is obtained as an oxidant to be fully mixed and contact with the above mixture of catalyst/wastewater; and the oxidation and degradation of pollutants are processed under a normal pressure and a controlled temperature not exceeding 40° C.

Figure 5:
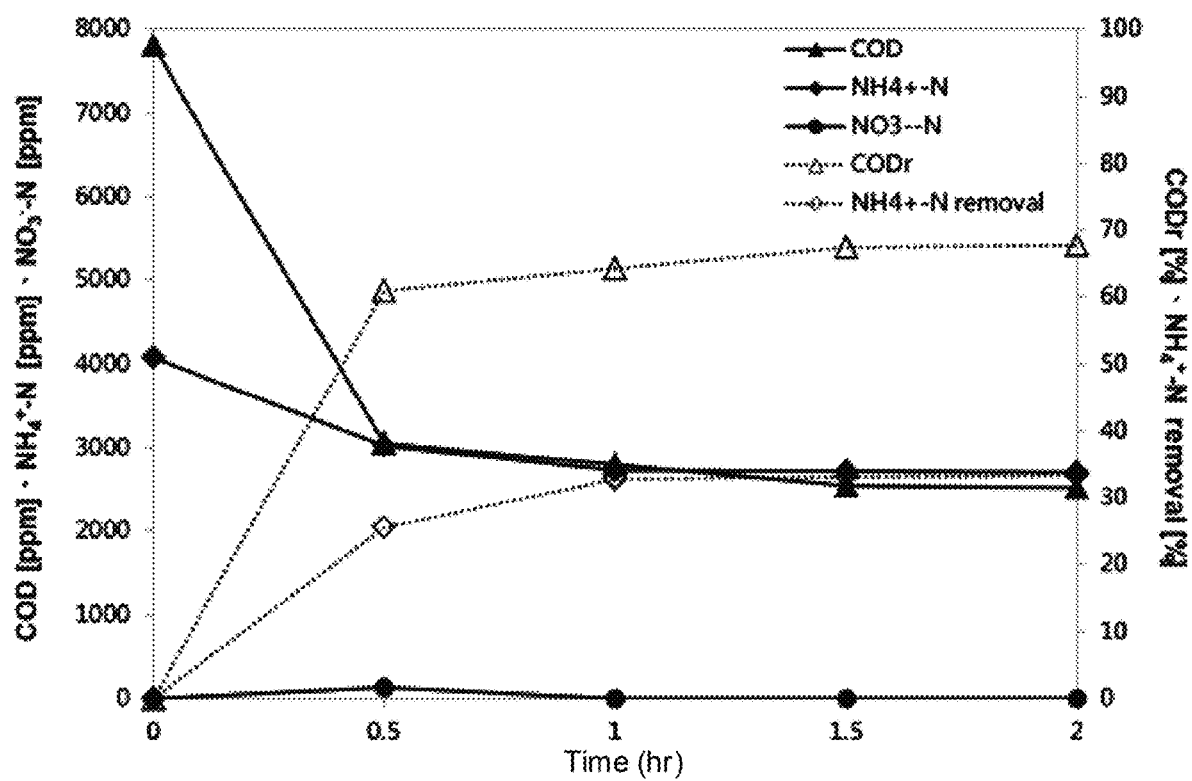
FIG. 5 is the view showing the relationship of time to the COD, ammonia-nitrogen concentration, nitrate-nitrogen concentration, COD removal rate, and ammonia-nitrogen removal rate of the second state-of-use.

A result of State-of-use 2 is shown in FIG. 5. According to the result, when the oxidative degradation is reacted for 0.5 hrs, the COD is greatly reduced from the original 7805 ppm to 3050 pm; and the ammonia-nitrogen is reduced from the original 4070 ppm to 3030 ppm. Besides, nitrate-nitrogen is increased from 0 to 130 ppm after 1 hr of reaction (the nitrogen removal which generates $N_2$ is more significant than that which obtains nitrate-nitrogen through conversion, so that the concentration of residual nitrate-nitrogen in each state-of-use is much smaller than that of initial ammonia-nitrogen). When the reaction is processed for 2 hrs, the residual COD amount is 2520 ppm and the ammonia-nitrogen is slowly reduced from the original 3050 ppm at 0.5 hrs to 2710 ppm and nitrate-nitrogen is not found anywhere. The above result indicates that, even if the present invention is operated under a poor wastewater quality and an acidity of pH<5 (pHi~4.81) with the same dosage ratio of State-of-use 1 applied to State-of-use 2, a certain effect on the removal of COD and ammonia-nitrogen can be also achieved at the same time. Not only about 5285 ppm of COD is effectively degraded (where COD removal rate reaches 67.7%); but also about 1360 ppm of ammonia-nitrogen is removed at the same time (where ammonia-nitrogen removal rate reaches 33.4%); furthermore, the appearance before and after the treatment is significantly improved (which is yellow before the treatment, and is turned into clear and transparent after the treatment).

[State-of-Use 3] UV-Catalyzed PSP Oxidation for Degrading Organic Ammonia-Nitrogen Wastewater from Refinery Industry The target to be treated in State-of-use 3 is still high-concentration organic ammonia-nitrogen wastewater produced by refinery industry, whose ammonia-nitrogen and organics mainly come from wastewater with high ammonia-nitrogen concentration generated through alkaline washing of wastewater acid gas during petroleum refining process. Accordingly, a state-of-use of FIG. 3 is obtained, where the same oxidation method is used to catalyze SPS or PMS with UV for degrading wastewater. The following is the details: The wastewater containing high-concentration organic ammonia-nitrogen is obtained from refinery industry and its pHi is adjusted to around 4.80 with sulfuric acid at first for ensuring that ammonia are existed in water only in a non-dissipative and stable ionized form ($NH_4^+$), where the contents of ammonia-nitrogen and COD of the wastewater obtained after pH adjustment are examined—4470 ppm and 7455 ppm, respectively. An initial condition is thus set in advance for processing the UV/SPS oxidative degradation shown in FIG. 3.

A measured ratio of Ox/(COD+ammonia nitrogen)=16 (with oxidant about 194000 ppm≈200 mM) is applied as a required oxidant to be fully and evenly mixed with the to-be-treated wastewater. A UV light source is turned on at the same time; and, after the light source is stable, the mixture of oxidant/wastewater is introduced into a UV reaction device to be continuously mixed and exposed to the UV light source in accordance with the aeration having pump circulation as described in FIG. 3. The oxidation and degradation of pollutants are processed under a normal pressure and a controlled temperature not exceeding 40° C.

Figure 6:
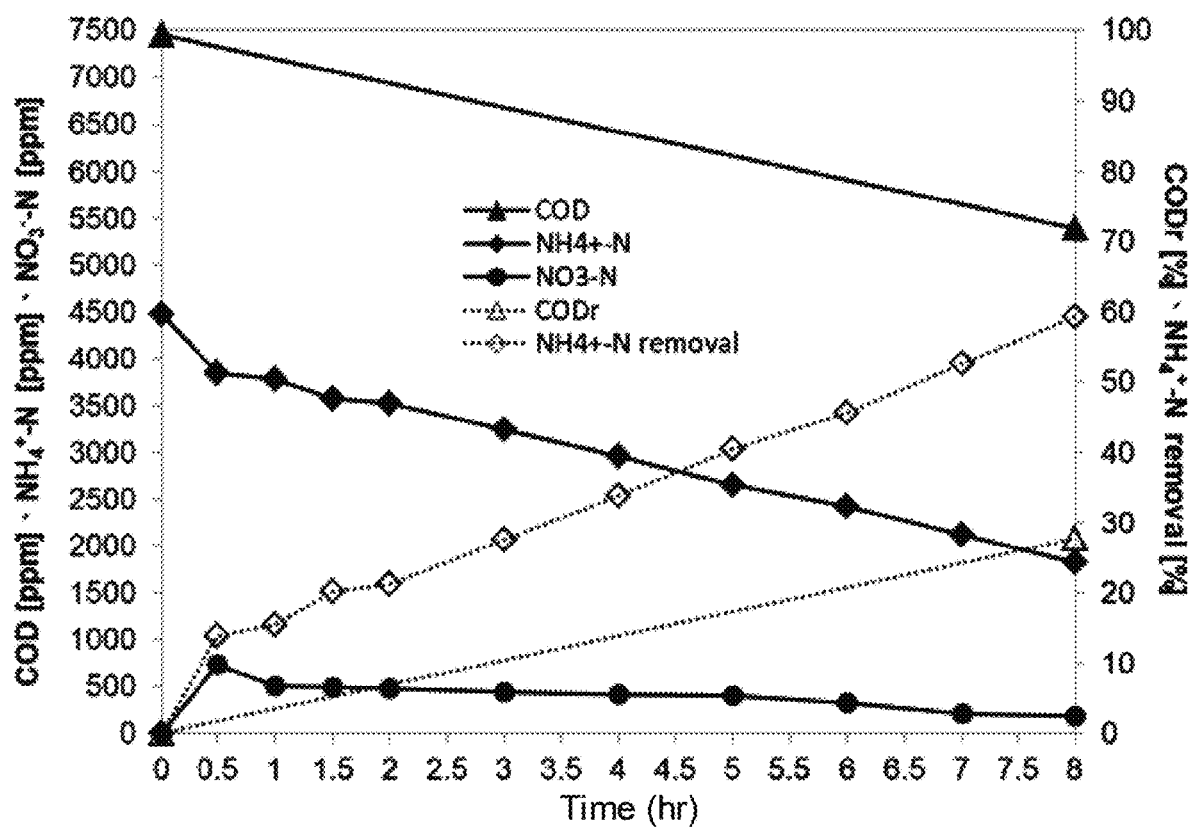
FIG. 6 is the view showing the relationship of time to the COD, ammonia-nitrogen concentration, nitrate-nitrogen concentration, COD removal rate, and ammonia-nitrogen removal rate of the third state-of-use.

Owing to the relatively higher dose of the oxidant used in State-of-use 3, the addition of the oxidant has more interference on the COD analysis at the initial stage of the degradation. Hence, in the later stage of reaction, sampling analysis is performed to observe overall removal effect and changes in the sum of ammonia-nitrogen. A result of State-of-use 3 is shown in FIG. 6. According to the result, on reacting for 0.5 hrs, the ammonia-nitrogen is reduced from the original 4470 ppm to 3850 pm. Besides, nitrate-nitrogen is increased from 0 to 735 ppm after 0.5 hr of reaction (the nitrogen removal which generates $N_2$ is more significant than that which obtains nitrate-nitrogen through conversion, so that the concentration of residual nitrate-nitrogen in each state-of-use is much smaller than that of initial ammonia-nitrogen). Following the reaction, the ammonia-nitrogen has a slow but steady dropping down in amount. When the reaction is processed for 2 hrs, the amount of ammonia-nitrogen slowly drops down from 4470 ppm at 0 hr to about 3520 ppm (with 950 ppm removed) and nitrate-nitrogen is reduced to 480 ppm. Hence, in this state-of-use, the reaction is deliberately prolonged to 8 hr and then stopped. At this moment, the residual COD amount is 700 ppm, where 2650 ppm of the ammonia-nitrogen is removed as the total removal rate of the ammonia-nitrogen is about 60%. In the same time, nitrate-nitrogen is also reduced to 190 ppm; and residual COD in the reacted solution is about 5390 ppm (with 2065 ppm of COD removed), where COD removal rate reaches 28%. The result shows that, even if the present invention is operated under an acidity of pH<5 (pHi~4.62), it still has a significant removal effect on ammonia-nitrogen. Although a certain degree of COD can be removed under this acidic condition, the degradation effect may be worse than that of the treatment under a medium alkaline condition. As is known, the oxidation of persulfate can promote the generation of sulfate radicals by the catalyzation of alkaline substances like NAOH, where alkaline environment is an advantage. However, in terms of overall effect, the result of State-of-use 3 operated in alkaline environment shows a considerable removal effect on high-concentration ammonia-nitrogen and organics. The result of State-of-use 3 also shows that the removal rate of ammonia-nitrogen is similar to that of COD (similar degradation slopes). It denotes the characteristics of the present invention, and especially shows that the removal of high-concentration ammonia-nitrogen still obtains significant degradation in wastewater having organic pollutants coexisted.

[State-of-Use 4] UV-Catalyzed PSP Oxidation for Degrading Organic Ammonia-Nitrogen Wastewater from Refinery Industry The purpose of State-of-use 1 to State-of-use 3 is to deliberately ensure the existence of ionic ammonia ($NH_4^+$) in a stable form in water. Through the results of the above states-of-use, it is confirmed that the present invention can be implemented to effectively degrade organic ammonia-nitrogen wastewater under acidic condition. However, commercial wastewater treatment procedures, including Fenton's reaction and like-Fenton's reaction, have application limitation (pHi<4) and defects (a large amount of iron sludge generated; blockage; and subsequent treatment problems), which should be avoided or even replaced. Besides, based on the description of State-of-use 3, persulfate oxidation has a relatively advantageous condition of alkaline environment, which echoes with a major advantage that the present invention can be performed under neutral or even alkaline condition with high pHi. Thus, in State-of-use 4, the initial condition of the to-be-treated wastewater is adjusted to be in the range of neutral to weak alkaline (pHi=7-8) for operation.

The target to be treated in State-of-use 4 is still high-concentration organic ammonia-nitrogen wastewater produced by refinery industry. Accordingly, a preferred state-of-use of FIG. 3 is obtained, where the same oxidation is used to catalyze SPS or PMS with UV for degrading wastewater. The following is the details: The wastewater containing high-concentration organic ammonia-nitrogen is obtained from refinery industry and its pHi is adjusted to weak alkaline at first with sulfuric acid, where the contents of ammonia-nitrogen and COD of the wastewater obtained after pH adjustment are examined—900 ppm and 1530 ppm, respectively. An initial condition is thus set in advance for processing the UV/SPS oxidative degradation shown in FIG. 3.

State-of-use 4 is applied with the same operation as State-of-use 3; and, the difference is that the initial pHi of the to-be-treated wastewater is about 7.0 and the input dose of oxidant/pollutant is relatively low—Ox/(COD+ammonia-nitrogen)=3.5 (with oxidant about 8484 ppm≈35 mM). Similarly, the oxidant is fully and evenly mixed with the to-be-treated wastewater. A UV light source is turned on at the same time; and, after the light source is stable, a mixture of the oxidant/wastewater is directed into a UV reactor to be mixed and contact with UV for illumination. The oxidation and degradation of pollutants are processed under a normal pressure and a controlled temperature not exceeding 40° C.

Figure 7:
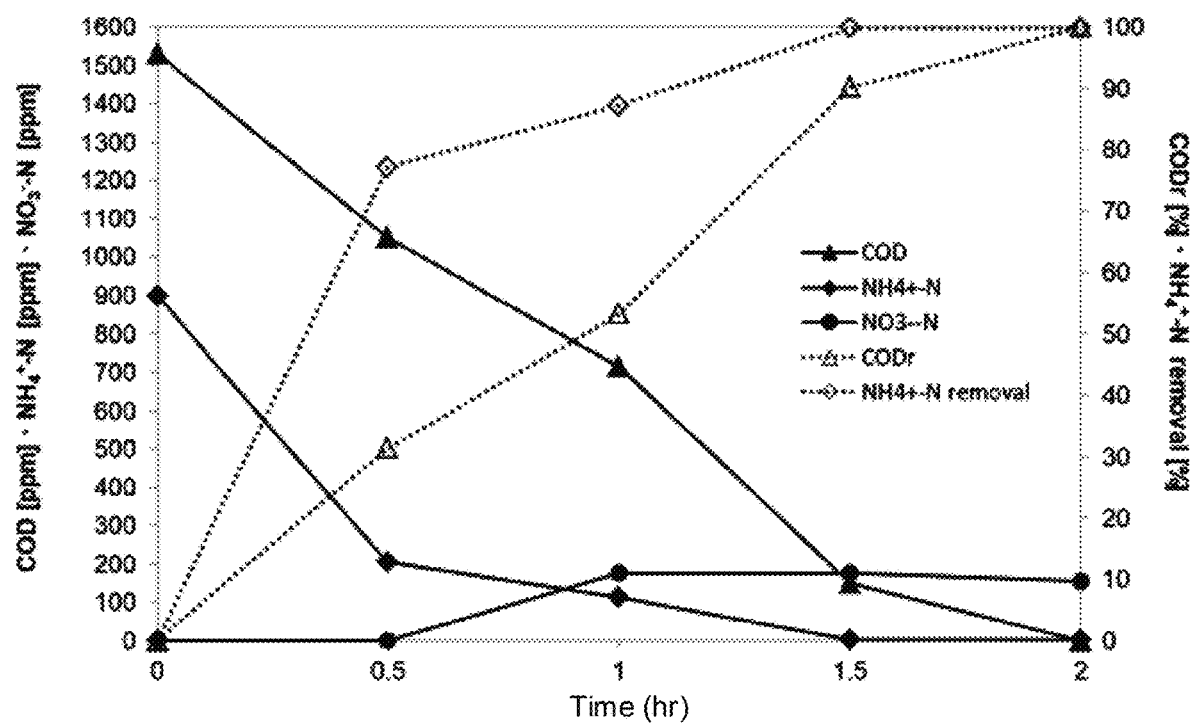
FIG. 7 is the view showing the relationship of time to the COD, ammonia-nitrogen concentration, nitrate-nitrogen concentration, COD removal rate, and ammonia-nitrogen removal rate of the fourth state-of-use.

A result of this state-of-use is shown in FIG. 7. According to the result, when the oxidative degradation is reacted for 0.5 hrs, the COD is greatly reduced from the original 1530 ppm to 1050 pm; and the ammonia-nitrogen is reduced from the original 900 ppm to 205 ppm. Besides, nitrate-nitrogen is increased from 0 to 175 ppm after 1 hr of reaction (the nitrogen removal which generates $N_2$ is more significant than that which obtains nitrate-nitrogen through conversion, so that the concentration of residual nitrate-nitrogen in each state-of-use is much smaller than that of initial ammonia-nitrogen). When the reaction is processed for 1.5 hrs, the residual COD amount is 150 ppm and nitrate-nitrogen is not found anywhere as being totally removed. When the reaction is processed for 2 hrs, COD is also completely removed and nitrate-nitrogen is 155 ppm. The above results of the present invention prove that, under an operating condition of pHi=7~8 (pHi~7.0), State-of-use 4 is applied with a lower dose ratio than State-of-use 3 for achieving rapid and complete removal of both COD and ammonia-nitrogen within 2 hrs (where COD removal rate is 100% and ammonia-nitrogen removal rate is 100%); furthermore, the appearance before and after the treatment is significantly improved (which is yellow before the treatment, and is turned into clear and transparent after the treatment). The ammonia-nitrogen completely removed in the this state-of-use is converted into nitrate-nitrogen which is easier to be decomposed by biological units—even converted into a form of non-toxic and harmless $N_2$ to be removed from water.

[State-of-Use 5] UV-Catalyzed PSP Oxidation for Degrading Organic Ammonia-Nitrogen Wastewater from Refinery Industry Accordingly, another preferred state-of-use of FIG. 3 is obtained. State-of-use 5 is operated the same as State-of-use 4 and the only difference is the application of another batch of to-be-treated organic ammonia-nitrogen wastewater from refinery industry with worse water quality (COD=2190 ppm, ammonia-nitrogen=1900 ppm), where the other conditions include that the pHi is also adjusted to ~7.0 and the dose ratio of oxidant/pollutant in State-of-use 5 is also Ox/(COD+ammoni-nitrogen)=3.5 (with oxidant about 14280 ppm≈162 mM). Similarly, through the mixing and the contacting with UV, the oxidation and degradation of pollutants are processed under a normal pressure and a controlled temperature not exceeding 40° C.

Figure 8:
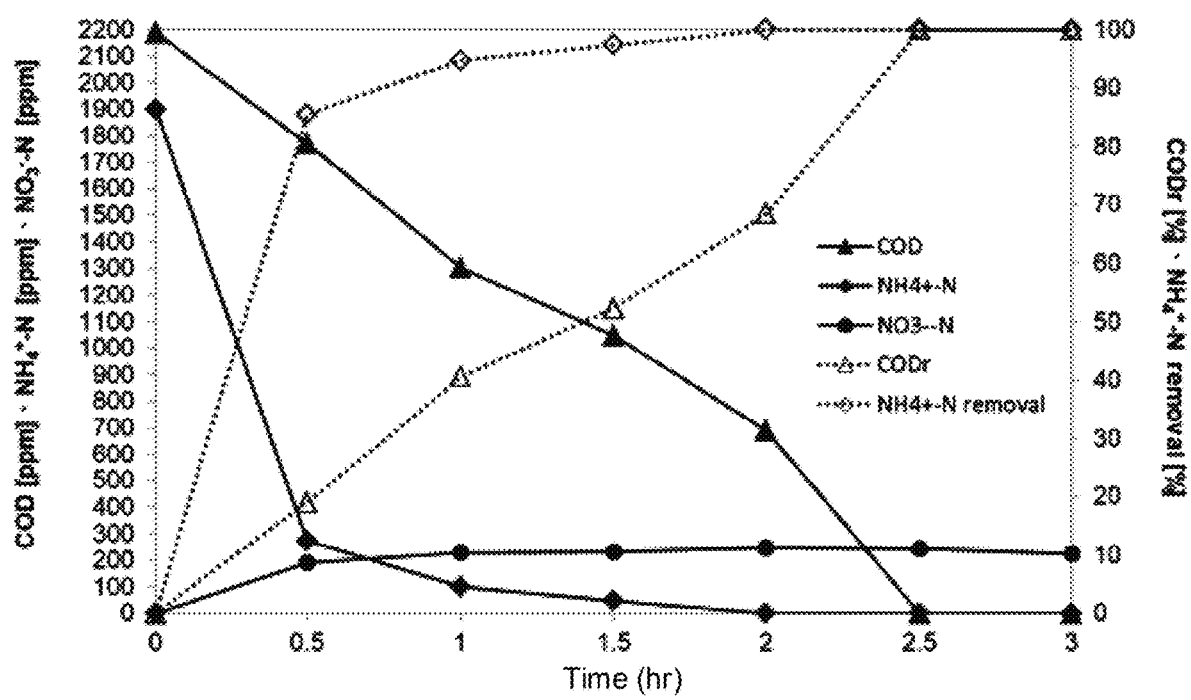
FIG. 8 is the view showing the relationship of time to the COD, ammonia-nitrogen concentration, nitrate-nitrogen concentration, COD removal rate, and ammonia-nitrogen removal rate of the fifth state-of-use.

A result of this state-of-use is shown in FIG. 8. According to the result, when the oxidative degradation is reacted for 0.5 hrs, the COD is reduced from the original 2190 ppm to 1774 pm; the ammonia-nitrogen is drastically and rapidly reduced from the original 1900 ppm to 275 ppm; and nitrate-nitrogen is increased from 0 to 190 ppm (the nitrogen removal which generates $N_2$ is more significant than that which obtains nitrate-nitrogen through conversion, so that the concentration of residual nitrate-nitrogen in each state-of-use is much smaller than that of initial ammonia-nitrogen). When the reaction is processed for 2 hrs, the residual COD amount is 692 ppm and nitrate-nitrogen is not found anywhere as being totally removed to 0. When the reaction is processed for 2.5 hrs, COD is also completely removed and nitrate-nitrogen is 242 ppm. The above results of State-of-use 5 prove that, under the same operating condition of pHi~7.0, State-of-use 5 only needs 0.5 hrs more of processing time (to a total of 2.5 hrs) than State-of-use 4 to achieve complete removal of both COD and ammonia-nitrogen having higher dose (where COD removal rate is 100% and ammonia-nitrogen removal rate is 100%); furthermore, the appearance before and after the treatment is significantly improved (which is yellow before the treatment, and is turned into clear and transparent after the treatment). Similarly, the ammonia-nitrogen completely removed in the this state-of-use is converted into nitrate-nitrogen which is easier to be decomposed by biological units—even converted into a form of non-toxic and harmless $N_2$ to be removed from water.

[Comparative Uses]

[Comparative Use 1] Co(II)-Catalyzed PMS Oxidation for Degrading Organic Ammonia-Nitrogen Wastewater from Petrochemical Industry According to the results of the above states-of-use obtained through the oxidative degradation of no matter 'Co(II) catalyzation' or 'UV illumination', another main feature of the present invention is the excellent effect of application on processing organic wastewater not containing ammonia-nitrogen. Comparative use 1 is applied with two sources of organic wastewater not containing ammonia-nitrogen from petrochemical industry, where the two sources of organic wastewater comprises wastewater from aromatics plant (containing 5250 ppm of COD composed of methyl tert-butyl ether (MTBE), N-methyl pyrrolidinone (NMP), and Sulfolane) as Wastewater 1 and wastewater from tank washing (containing 7705 ppm of COD mainly composed of MTBE) as Wastewater 2 to operate Comparative use 1 to be compared with the states-of-use.

Comparative use 1 processes the Co(II)/PMS oxidative degradation of FIG. 2. The original pH values of the two sources of wastewater are 5.8~6.0 and, therefore, no pre-test adjustments are made. About 20 ppm of cobalt sulfate is provided as a required catalyst to be fully and evenly mixed with the to-be-treated wastewater. A measured ratio of Ox/(COD+ammonia nitrogen)=12.3 (with 64454 ppm≈105 mM of oxidant applied to Wastewater 1 and 94594 ppm≈154 mM applied to Wastewater 2) of PMS is obtained as an oxidant to be fully mixed and contact with the above mixture of catalyst/wastewater; and the oxidation and degradation of pollutants are processed under a normal pressure and a controlled temperature not exceeding 40° C.

Figure 9:
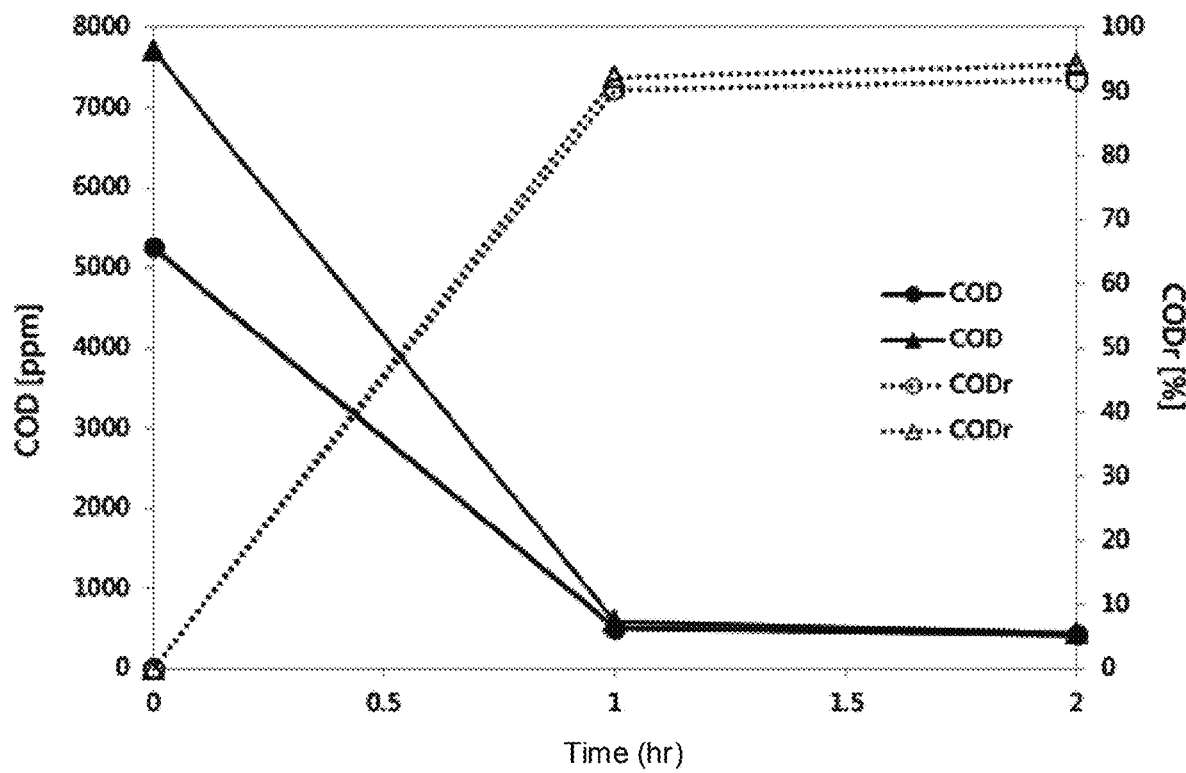
FIG. 9 is the view showing the relationship of time to the COD and COD removal rate of the first comparative state-of-use.

A result of Comparative use 1 is shown in FIG. 9. According to the result, after processing the two sources of wastewater for 1 hr, CODs are drastically reduced from the original 5250 ppm and 7705 ppm to 510 ppm and 590 ppm and obtain COD removal rates as 90.29% and 92.28%, respectively. When the reaction is processed for 2 hrs, the two sources of wastewater have 430 ppm and 450 ppm of COD residues and obtain improved COD removal rates as 91.81% and 94.16%, respectively; furthermore, the appearance before and after the treatment is significantly improved (which are yellow and opaque black before the treatment, and is turned into clear and transparent after the treatment, respectively). It is shown in the result of Comparative use 1 that the present invention can be operated under a near neutral condition (pHi~4.81) and achieves the rapid destroying and degrading of high-concentration organic toxic wastewater within 1 hr to 2 hrs with a removal rate reaching 90% more. Thus, it is proved that the present invention does not need to undergo pH pre-adjustment, where convenience and operational flexibility for actual industrial applications are improved with economic advantage practiced.

[Comparative Use 2] UV-Catalyzed PSP Oxidation for Degrading Organic Spent Lye from Petrochemical Industry According to the result of Comparative use 1, it is proved that the application of catalyzing/activating oxidation and degradation of the present invention obtains excellent effect on processing organic wastewater. Comparative use 2 is applied with a mixture of organic/non-organic spent lye generated through light-oil cracking from petrochemical industry. The mixture mainly comprises NaOH, sodium carbonate ($Na_2CO_3$), organic sulfide (sodium hydrosulfide (NaHS), sodium sulfide ($Na_2S$), and sodium thiolate (NaSR)), phenol, oil, and polymer. The petrochemical spent lye is generally processed in a wastewater processing plant with a wet-air oxidation (WAO) device. After processing WAO, most of the sulfides (NaHS, $Na_2S$, NaSR) are removed, but the ultimate removal effect on COD is still limited (with residual COD usually around 1100 ppm~2700 ppm). Thus, the target of Comparative use 2 is to use the present invention to directly process oxidative degradation to the spent lye (pH 12.9~13.9) without pH adjustment. Comparative use 2 is applied with a spent lye having relatively poor quality (COD=2920 ppm). The sulfide of the spent lye is removed through the above-mentioned WAO or other method (the removal and evaluation of sulfide is beyond the scope of the present invention).

Comparative use 2 processes the same UV/SPS oxidative degradation of FIG. 3. The pH value of the spent lye is about 13.04 with no pre-adjustment. A measured ratio of Ox/(COD+ammonia nitrogen)=4.89 (with oxidant about 14280 ppm≈60 mM) of sodium persulfate is obtained as an oxidant to be fully mixed with the to-be-treated spent lye and keep in contact with UV for illumination according to the method shown in FIG. 3 and to process the oxidation and degradation of pollutants under a normal pressure and a controlled temperature not exceeding 40° C.

Figure 10:
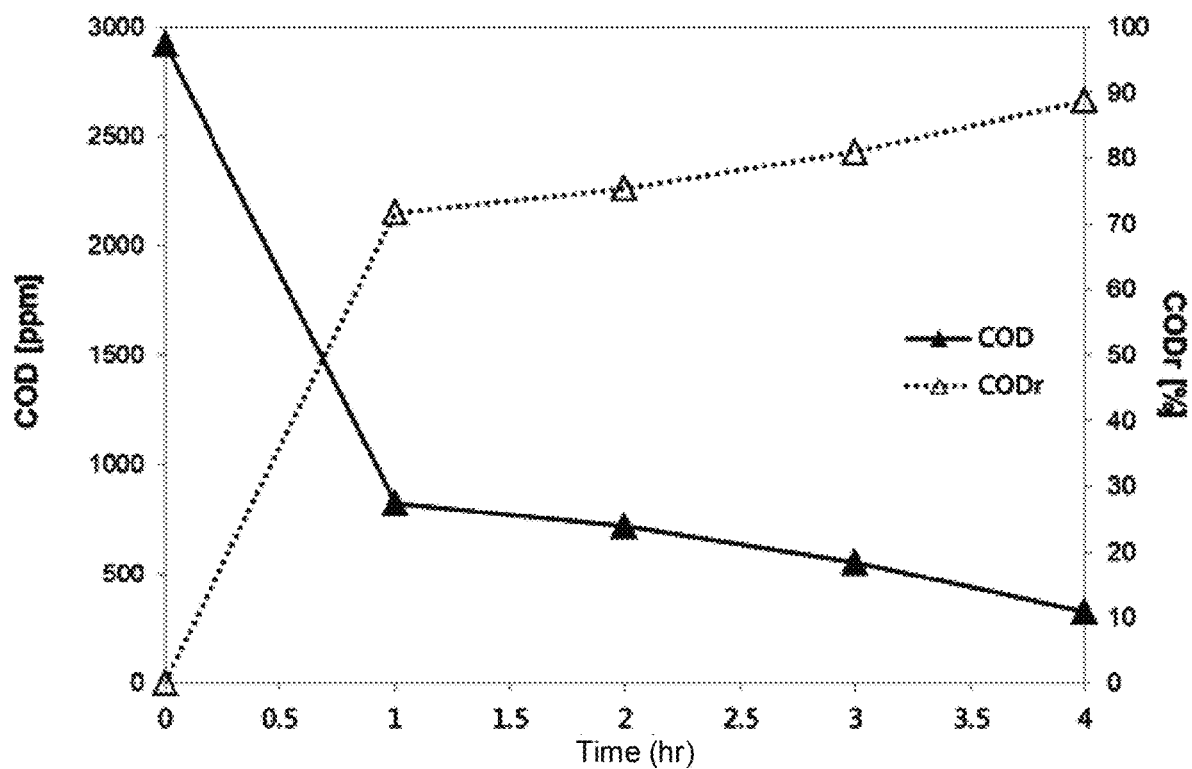
FIG. 10 is the view showing the relationship of time to the COD and COD removal rate of the second comparative state-of-use.

A result of Comparative use 2 is shown in FIG. 10. As shown in the result, Comparative use 2 degrades the COD of the spent lye from 2920 ppm to 330 ppm (where COD removal rate is ~88.7%); furthermore, the appearance before and after the treatment is significantly improved (which is dark yellow before the treatment, and is turned into clear and transparent after the treatment). Besides, the pH value of the spent lye obtained after the treatment is 12.21, as having little difference as before. The result shows that Comparative use 2 has an excellent effect on UV-activated oxidation as using the present invention. While assisting and improving the existing process limitation of traditional WAO of wastewater plant, the amount of residual organics (COD) is small after the treatment and the alkalinity of the alkali solution is maintained at more than pH12 as well. The above result shows that the present invention has excellent applicability for treating this type of petrochemical spent lye. By using the present invention to process the spent lye, not only the load of biological treatment of the subsequent wastewater plant is reduced; but also a lye can be planned to be regenerated and used as a supplementary required for the aforementioned light-oil cracking. Therein, the use amount of acidity-neutralizing agent before and after the treatment is greatly reduced with economic advantage (as in line with circular economy).

A thing worth further mentioning is that many specific chemical and industrial wastewater (such as that of paper industry, pulp industry, photography industry, automobile industry, metal industry, electroplating industry, etc.) usually contains a lot of transition metal ions (such as ions of manganese (Mn), iron (Fe), copper (Cu), silver (Ag), nickel (Ni) and cobalt (Co)). These metal ions often generate a large amount of metal sludge during processing the wastewater. In the future, if the metal removal could be combined in advance with the (photo-)catalyzing oxidation and degradation of the present invention, certain specific organic harmful substances and ammonia-nitrogen would presumably decomposed and removed. Thus, not only everything obtains its best use, but also numerous benefits are gotten at one fell swoop.

As is described above, the present invention processes wastewater for degrading high-concentration ammonia-nitrogen and organic pollutants at the same time, where an apparatus thereof comprises a (photo-)catalyzation tank and a subsequent neutralization tank. The present invention mainly introduces organic wastewater containing ammonia-nitrogen into a tank for processing reactions without adjustment of acidic agent or other additives. A persulfate oxidant in the tank processes high-efficiency oxidative degradation of ammonia-nitrogen and organic poisons in industrial wastewater through catalyzing oxidation of UV activation, catalyzation with tiny amount of transition-metal, or both of the above reactions to achieve simultaneous reduction (or complete removal) of ammonia-nitrogen and organic carbon contents. After neutralization according to actual needs, the final output is complied with biological treatment conditions, discharged-water quality standards, or recycled-water standards. With the high-efficiency catalyzing oxidation, not only various toxic organic substances, such as alkyls, aromatics, heterocyclic compounds (e.g. cyclobutane, N-methylpyrrolidone), etc., are degraded; but also ammonia-nitrogen in water are converted into non-toxic nitrogen gas ($N_2$) and nitrate-nitrogen ($NO_3^-$—N) at the same time. After the reactions, the content of ammonia-nitrogen ($NH_4^+$—N) and nitrate-nitrogen in wastewater is reduced aboundantly with efficiency, or even completely removed.

Thus, the biggest advantage of the present invention is that the organic suspended solids can be filtered, precipitated, or floated without pre-treatment while the oxidative degradation is processed simultaneously for providing excellent operating flexibility. Another advantage is that the applicable pH range is wide for processing oxidation of deriving free radicals under an acidic to alkaline range without dilution and even without pH adjustment, where ammonia-nitrogen and organic harmful substances in wastewater are thus degraded. Furthermore, because of the high processing efficiency of the present invention, apparatus continuously operated in a semi-batch mode can be used with a small area of land required only, which is very suitable to be constructed as an industrial wastewater processing unit.

To sum up, the present invention is a method for processing wastewater having organics even together with high-concentration ammonia-nitrogen, where the difficulties in processing organic ammonia-nitrogen wastewater are overcome with effectiveness improved for directly handling high-concentration industrial organic ammonia-nitrogen wastewater with short processing time and good degradation and denitrification efficiency; and the present invention can be directly used to treat all kinds of organic wastewater and waste lye from petrochemical plants and refineries.

The preferred embodiment herein disclosed is not intended to unnecessarily limit the scope of the invention. Therefore, simple modifications or variations belonging to the equivalent of the scope of the claims and the instructions disclosed herein for a patent are all within the scope of the present invention.

What is claimed is:

1. A method for processing wastewater having organic ammonia-nitrogen comprising:
   mixing an oxidant and an organic ammonia-nitrogen wastewater in a catalyzation tank so as to dissolve the oxidant, wherein a ratio of said oxidant (Ox) to a chemical oxygen demand (COD) plus ammonia-nitrogen (Ox/(COD+ammonia-nitrogen)) is 0.1-30, and said oxidant is selected from a group consisting of potassium peroxymonosulfate (PMS) and a mixture of potassium peroxymonosulfate and persulfate;
   processing said oxidant dissolved in said organic ammonia-nitrogen wastewater through a reaction selected from a group consisting of activation by applying ultraviolet (UV) illumination, catalyzation by adding a catalyst of a transition metal, and a combination thereof and simultaneously aerating the organic ammonia-nitrogen wastewater with a gas selected from a group consisting of air and oxygen so as to derive free radicals from said oxidant to simultaneously oxidize organic ammonia-nitrogen and other organic pollutants in the organic ammonia-nitrogen wastewater and obtain a processed solution, wherein a ratio of said catalyst of said transition metal to said oxidant is 0.00001-0.003, and said free radicals are active free radicals, comprising at least a selective free radical of $SO_4-$, a non-selective free radical of HO, and a superoxide radical of ROO; and
   directing the processed solution to a neutralization tank to adjust a pH value of said processed solution.

2. The method according to claim 1, wherein said ammonia-nitrogen in said organic ammonia-nitrogen wastewater has a maximum concentration of 4500 mg/L; and a highest concentration of COD is 7500 mg/L.

3. The method according to claim 1, wherein a concentration of said ammonia-nitrogen in said organic ammonia-nitrogen wastewater is 500-3000 mg/L and a COD of the concentration of organics is 500-6000 mg/L.

4. The method according to claim 1, wherein a pollutant source of said organic ammonia-nitrogen wastewater is industrial wastewater from one or both of petrochemical industries and refinery industries, pollutants of said organic ammonia-nitrogen wastewater are ammonia-nitrogen and organics, and said organics are compounds each of which is selected from a group consisting of a volatile organic, a non-volatile organic, a halogen-containing organic, a non-halogen organic, a polycyclic aromatic hydrocarbon, an aliphatic hydrocarbon, a heterocyclic hydrocarbon, a petroleum hydrocarbon, an organic solvent, and a polymer.

5. The method according to claim 1, wherein a pollutant source of said organic ammonia-nitrogen wastewater comprises industrial wastewater, domestic wastewater, and groundwater.

6. The method according to claim 1, wherein said persulfate is selected from a group consisting of sodium persulfate ($Na_2S_2O_8$) and potassium persulfate ($K_2S_2O_8$) ~; and said PMS is potassium peroxymonosulfate sulfate ($2KHSO_5 \cdot KHSO_4 \cdot K2SO_4$).

7. The method according to claim 1, wherein the ratio of Ox/(COD+ammonia-nitrogen) is 3.5-16.

8. The method according to claim 1, wherein, in said second step, said transition metal is selected from a group consisting of divalent ferrum (Fe(II)), divalent cobalt (Co(II)), divalent nickel (Ni(II)), divalent cuprum (Cu(II)), divalent zinc (Zn(II)), a mixture of one of the above, and a derivative of one of the above; and wherein neither said mixture nor said derivative is selected from a group consisting of a nitrate and a chloride.

9. The method according to claim 1, wherein, in said second step, a ratio (in mg/L) of said catalyst of said transition metal of Co(II) to said oxidant is 0.0001~0.002.

10. The method according to claim 1, wherein, in said second step, through said aeration and a process selected from a group consisting of (i) said catalyzation with said transition metal and (ii) UV illumination, said oxidation of said ammonia-nitrogen and a process of obtaining nitrate-nitrogen through the degradation of said ammonia-nitrogen are promoted and additively processed; and a main reaction processed is as follows:

said promotion involved in aeration is

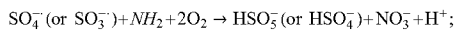

and
said promotion involved with said transition metal is

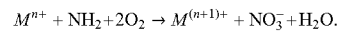

11. The method according to claim 1,
wherein the dosage of said catalyst of said transition metal of Co(II) is not greater than 30 mg/L; said oxidant processed said catalyzation of a compound selected from a group consisting of said persulfate and said PMS to obtain free radicals of $SO_4-.$, HO., and Co(III); said Co (III) reacts with $SO_4^{2-}$ in water to obtain an additional free radical of $SO_4-.$ and reduce said Co(III) back to Co(II);
said aeration is processed with the coordination of a gas selected from a group consisting of air and oxygen to promote the participation of oxygen in reaction;
a free radical of R. is derived from organics and formed into a superoxide radical of ROO.; said superoxide radical of ROO. is obtained to promote and additively process not only the reduction of Co(III) back to Co(II) but also the derivation of an additional hydroxyl radical of HO.; and a main reaction processed is as follows:

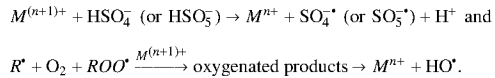

12. The method according to claim 1,
wherein, in said second step, through said UV illumination, a salt selected from a group consisting of said persulfate and said PMS is activated and promoted to obtain free radicals of $SO_4-.$ and HO.; furthermore, in a reaction apparatus processing said catalyzation, said oxidation, and said degradation with the help of said transition metal, the reduction of said transition metal additionally obtains additive processing through said UV illumination and obtains additional free radicals of R. and HO. to additively process said degradation; and a main reaction processed is as follows:

$$M(RCO_2)^{n+} + h\nu \xrightarrow{LMCT} M^{n+} + CO_2 + R^\bullet \text{ and}$$

$$M(OH)^{n+} \xrightarrow{h\nu} M^{n+} + {}^\bullet OH,$$

wherein R. is an intermediate free radical derived from said degradation of organics and ROO. is a superoxide radical derived from R.

13. The method according to claim 1, wherein, in said second step, said oxidation activated through said UV illumination processes said organic ammonia-nitrogen wastewater having an initial pH (pHi) of 0~14; and said oxidation catalyzed with said transition metal of Co(II) processes said organic ammonia-nitrogen wastewater having a pHi of 0~8.

14. The method according to claim 1, wherein a light source applying the UV illumination has a wavelength of 180-365 nm.

15. The method according to claim 1, wherein a processing time is 1-8 hours in total.

* * * * *